United States Patent
Hayes et al.

(10) Patent No.: US 10,464,202 B2
(45) Date of Patent: Nov. 5, 2019

(54) POWER TOOLS WITH TITANIUM HAMMER CASES AND ASSOCIATED FLANGE INTERFACES

(71) Applicant: Ingersoll-Rand Company, Davidson, NC (US)

(72) Inventors: Connor Allan Hayes, Onalaska, WI (US); James Francis Bouchard, Bethlehem, PA (US); Randolph Robert Ruetsch, Branchburg, NJ (US); Michael Sikorski, Bath, PA (US)

(73) Assignee: Ingersoll-Rand Company, Davidson, NC (US)

( * ) Notice: Subject to any disclaimer, the term of this patent is extended or adjusted under 35 U.S.C. 154(b) by 670 days.

(21) Appl. No.: 13/769,483

(22) Filed: Feb. 18, 2013

(65) Prior Publication Data

US 2013/0228356 A1 Sep. 5, 2013

Related U.S. Application Data

(60) Provisional application No. 61/606,866, filed on Mar. 5, 2012.

(51) Int. Cl.
*B25F 5/02* (2006.01)
*B25B 21/02* (2006.01)
*B23P 15/00* (2006.01)

(52) U.S. Cl.
CPC ............... *B25F 5/02* (2013.01); *B23P 15/00* (2013.01); *B25B 21/02* (2013.01); *Y10T 29/49945* (2015.01)

(58) Field of Classification Search
CPC .... B25F 5/00; B25F 5/02; H02K 5/00; B25D 15/00; B23P 15/00; Y10T 29/49945
USPC .......................................... 173/90, 213, 171
See application file for complete search history.

(56) References Cited

U.S. PATENT DOCUMENTS

| | | |
|---|---|---|
| 3,661,217 A | 5/1972 | Maurer |
| 5,624,000 A | 4/1997 | Miller |
| 5,650,676 A * | 7/1997 | Blumenberg ......... B60T 8/4022 |
| | | 310/239 |
| 6,149,356 A | 11/2000 | Chu et al. |
| 6,902,013 B2 | 6/2005 | Aeberhard |

(Continued)

FOREIGN PATENT DOCUMENTS

| | | |
|---|---|---|
| WO | WO 98-31965 | 7/1998 |
| WO | WO-9831965 A1 * | 7/1998 ............... F16M 7/00 |

OTHER PUBLICATIONS

Product review and blog, CopTool.com, http://coptool.com/blog/ingersoll_rand/, 2pages, Aug. 4, 2011, printed from the internet Mar. 1, 2012.

(Continued)

*Primary Examiner* — Alexander M Valvis
*Assistant Examiner* — Mary C Hibbert-Copeland
(74) *Attorney, Agent, or Firm* — Jones IP Group; Wayne A. Group (57) ABSTRACT

Power tools with housings or hammer cases include a thin wall titanium shell tapering from a smaller forward section to a larger rearward section; with at least the rearward section having a wall with a substantially constant wall thickness and an interface flange that includes an outer perimeter profile that is curvilinear and defines a plurality of outwardly extending detents that provide an interference fit with the wall of the hammer case.

13 Claims, 11 Drawing Sheets

(56) References Cited

U.S. PATENT DOCUMENTS

| | | | |
|---|---|---|---|
| 7,222,680 B2 | 5/2007 | Livingston et al. | |
| 7,789,169 B2 | 9/2010 | Berry et al. | |
| 2003/0121680 A1* | 7/2003 | Izumisawa | B25B 21/02 173/93.5 |
| 2005/0161243 A1* | 7/2005 | Livingston | B25B 21/02 173/93 |
| 2009/0126964 A1* | 5/2009 | Schroeder | B25F 5/02 173/217 |
| 2009/0194306 A1* | 8/2009 | Johnson | B25F 5/006 173/162.1 |
| 2011/0024148 A1* | 2/2011 | Lamprecht | B25F 5/02 173/162.2 |

OTHER PUBLICATIONS

Product listing, Ingersoll Rand Titanium Quiet Tool Air Impact Wrench, http://www.northerntool.com/shop/tools/products_200353268_200353 . . . , 1 page, date unknown, printed from the internet Mar. 2, 2012.

International Search Report and Written Opinion for corresponding PCT Application No. PCT/US2013/028873, dated Jun. 24, 2013.

International Preliminary Report on Patentability dated Sep. 9, 2014 from International Patent Application No. PCT/US2013/028873 filed Mar. 4, 2013.

Office Action dated Sep. 5, 2015 from Chinese Patent Application No. 201310338465.3 filed Mar. 4, 2013.

Office Action dated May 16, 2016 from Chinese Patent Application No. 201310338465.3, filed Mar. 5, 2013.

Office Action dated Nov. 16, 2016 from Chinese Patent Application No. 201310338465.3, filed Mar. 5, 2013.

Notification to Grant Patent Right for Invention dated Apr. 28, 2017 from Chinese Patent Application No. 201310338465.3, filed Mar. 5, 2013.

\* cited by examiner

POWER TOOLS WITH TITANIUM HAMMER CASES AND ASSOCIATED FLANGE INTERFACES

RELATED APPLICATIONS

This application claims the benefit of and priority to U.S. Provisional Application Ser. No. 61/606,866 filed Mar. 5, 2012, the contents of which are hereby incorporated by reference as if recited in full herein.

FIELD OF THE INVENTION

This invention relates to power tools and is particularly suitable for hammer cases for impact wrenches.

BACKGROUND OF THE INVENTION

Various power tools, including corded electric, cordless electric and pneumatic tools are well-known. Examples of such tools include, but are not limited to, drills, drill drivers, impact wrenches, grease guns and the like. Many of these tools have a pistol style housing generally including a tool body defining a head portion with a handle depending therefrom, but other form factors can be used.

In the past, investment casting titanium hammer cases have been used for impact wrenches such as described in U.S. Pat. No. 7,222,680 and U.S. Patent Application Publication No. 2005/0161243, the contents of which are hereby incorporated by reference as if recited in full herein.

SUMMARY OF EMBODIMENTS OF THE INVENTION

Embodiments of the invention are directed to power tools. The power tools include: (a) an external titanium housing having a forward portion and a rearward portion and defining a cavity, wherein the titanium housing has a body of deep drawn titanium with at least a major portion thereof, including a rear section thereof, having a thin wall with a substantially constant thickness; (b) an interface flange residing in the titanium housing cavity; and (c) an external motor housing extending rearward of the external titanium housing and attached to the interface flange.

The interface flange can be bonded to the titanium housing.

The power tool can be an impact wrench and the titanium housing can be a hammer case.

In some embodiments, the interface flange can withstand a pull out force of least 1000 lbs. for two seconds.

The titanium housing can be a monolithic unitary body that is formed from deep drawn titanium to provide a rear portion that has a thin wall of substantially constant thickness.

The interface flange can have outwardly extending detents that can include a plurality of corner detents with small gap air spaces residing on opposing sides of each detent.

The interface flange can have opposing front and rear ends and an outerwall extending therebetween with at least one attachment feature on the outerwall residing between the front and rear ends. The titanium housing body can have at least one cooperating attachment feature residing on an internal surface thereof residing proximate a rear end portion of the titanium housing body. The interface flange and titanium housing body attachment features can tightly abut to define a mechanical joint.

The interface flange attachment feature can include at least one transversely extending recess and the titanium housing body attachment feature can include at least one inwardly extending projection.

Other embodiments are directed to hammer cases for a power tool impact wrench. The hammer case include a thin wall titanium shell tapering from a smaller forward section to a larger rearward section, with at least the rearward section having a wall with a substantially constant wall thickness.

The interface flange can include an outer perimeter profile that is curvilinear and defines a plurality of outwardly extending detents that provide an interference fit with the wall of the hammer case.

The interface flange detents can include a plurality of corner detents with small gap air spaces residing on opposing sides of each detent prior to bonding.

There can be six substantially equally spaced apart interface flange detents.

Optionally, in some embodiments, the detents can provide about a 0.002 inch interference fit and adjacent gap spaces of about 0.005 inches.

The interface flange can be bonded to the hammer case so that a rear surface of the flange is flush with a rear of the hammer case.

The interface flange can withstand a pull out force of least 1000 lbs. for two seconds, typically about 5000 lbs. for two seconds, without failure of the joint.

Other embodiments are directed to methods of assembling a power tool. The methods include: (a) providing a hammer case having a titanium shell body; and (b) press fitting an interface flange into a rear portion of the shell body of the hammer case.

The interface flange can have outwardly extending detents that are sized and configured to form an interference fit against an inner surface of the thin wall.

The method can also include, after the press fitting, welding, brazing, bonding, or otherwise permanently attaching the interface flange to the hammer case shell body so that the interface flange can withstand a pull out force of about 1000 pounds for at least two seconds without joint failure.

The titanium shell body can be a deep drawn titanium shell body with a rear portion having a thin wall.

The detents, where used, can include four corner detents that engage the inner surface of the thin wall of the shell body leaving small air gap spaces about a perimeter of a junction of the shell body and the flange. The method can include, after the press fitting, inserting an epoxy into the gap spaces and curing to secure the interface flange to the hammer case.

The interface flange can have an outer perimeter profile that is curvilinear and an inner perimeter profile that is circular.

The interface flange detents can include a plurality of corner detents and interior detents residing between each corner detent and the press-fitting step can be carried out so that there are small gap air spaces residing on opposing sides of each detent.

There can be six substantially equally spaced apart interface flange detents.

Optionally, the press fitting can be carried out to provide about a 0.002 inch interference fit using the detents and adjacent gap spaces of about 0.005 inches.

The press fitting can include pushing the interface flange into the shell body of the hammer case so that a rear surface of the flange is flush with a rear of the hammer case.

The titanium housing can be a monolithic unitary body that is formed from deep drawn titanium and the rear section has a substantially constant thickness thin wall.

Embodiments of the invention are directed to providing power tool cases that comprise deep drawn thin titanium cases that can reduce material and/or labor costs associated with investment castings while providing the desired strength and/or structural rigidity.

Embodiments of the invention are directed to a power tool with a deep drawn titanium hammer case attached to a flange using interference fit detents.

The foregoing and other objects and aspects of the present invention are explained in detail in the specification set forth below.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DESCRIPTION OF EMBODIMENTS OF THE INVENTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The term "portable" refers to power tools that are sufficiently light to allow for portable use. The power tools may be pneumatic power tools that connect to pressurized air or other gas. In some embodiments, the power tools may be cordless in that do not require plug-in, hard-wired ("corded") electrical connections to an external power source to operate and may optionally include electric motors that are powered by on-board batteries, such as rechargeable batteries. Examples of different power tools include, screwdrivers, ratchets, nutrunners, impacts, drills, drill drivers, grease guns and the like.

The term "curvilinear" refers to lines or profiles that include arc segments of different radii (in contrast to a circle) and may include straight linear segments.

The term "detent" refers to a feature that is on an outer wall or perimeter of an interface flange to provide an interference fit with a portion of a mating wall of a target component, such as a hammer case. The term "titanium" refers to titanium material including titanium alloys. The word "about" for dimensions means that the size can vary by +/−10% and for operational outputs such as RPM, force, pull-out force, weight or torque and the like means the parameter can vary by +/−20%.

Embodiments of the invention may be particularly suitable for pneumatic impact wrenches. The pneumatic operated impact wrenches may be light weight, such as about 5 pounds or less, typically about 4 pounds or less. The impact wrenches can have any suitable output drive shaft size, metric or English. The drive can be configured to rotate at suitable high speeds and output desired torques. For example, for a ½ inch drive, the power tool can operate with desired speeds, typically between about 5000-10,000 RPM (no load) and can provide any suitable number of impacts per minute (IPM) such as between about 500-1500. The maximum reverse torque (for the ½ inch drive) can be about 780 ft-lbs while the forward torque can be about 550 ft lbs (and a nut busting torque can be double that amount).

Figure 1:
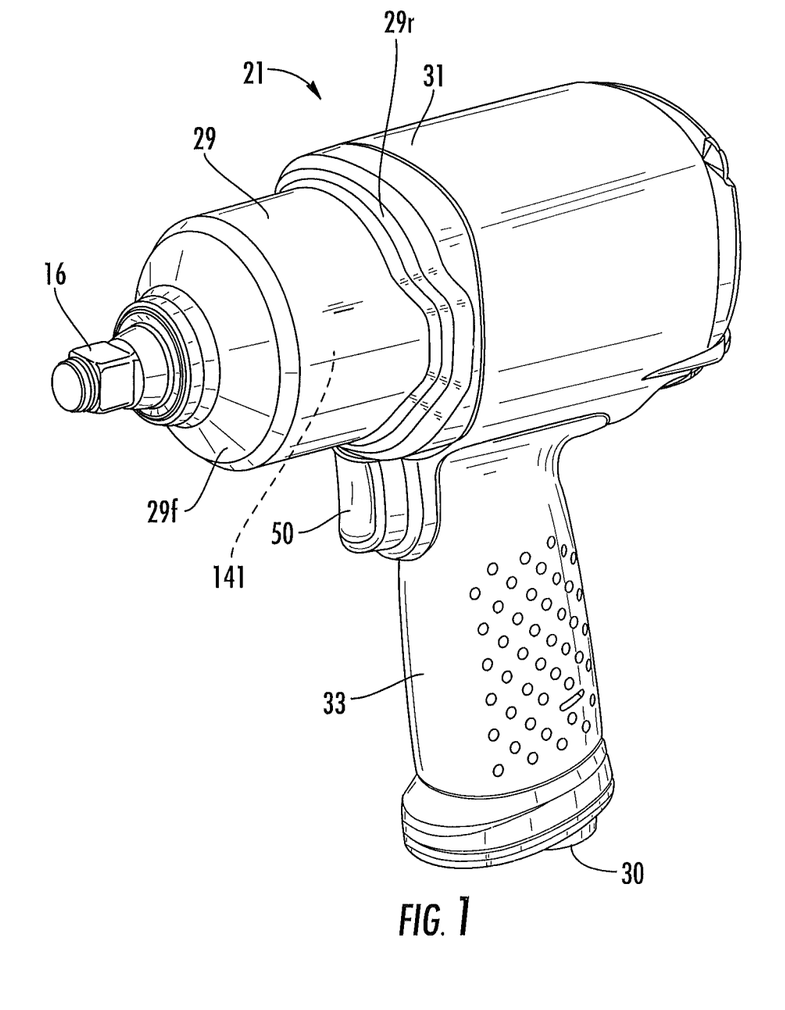
FIG. 1 is a side perspective view of an exemplary power tool according to embodiments of the present invention.
Figure 2:
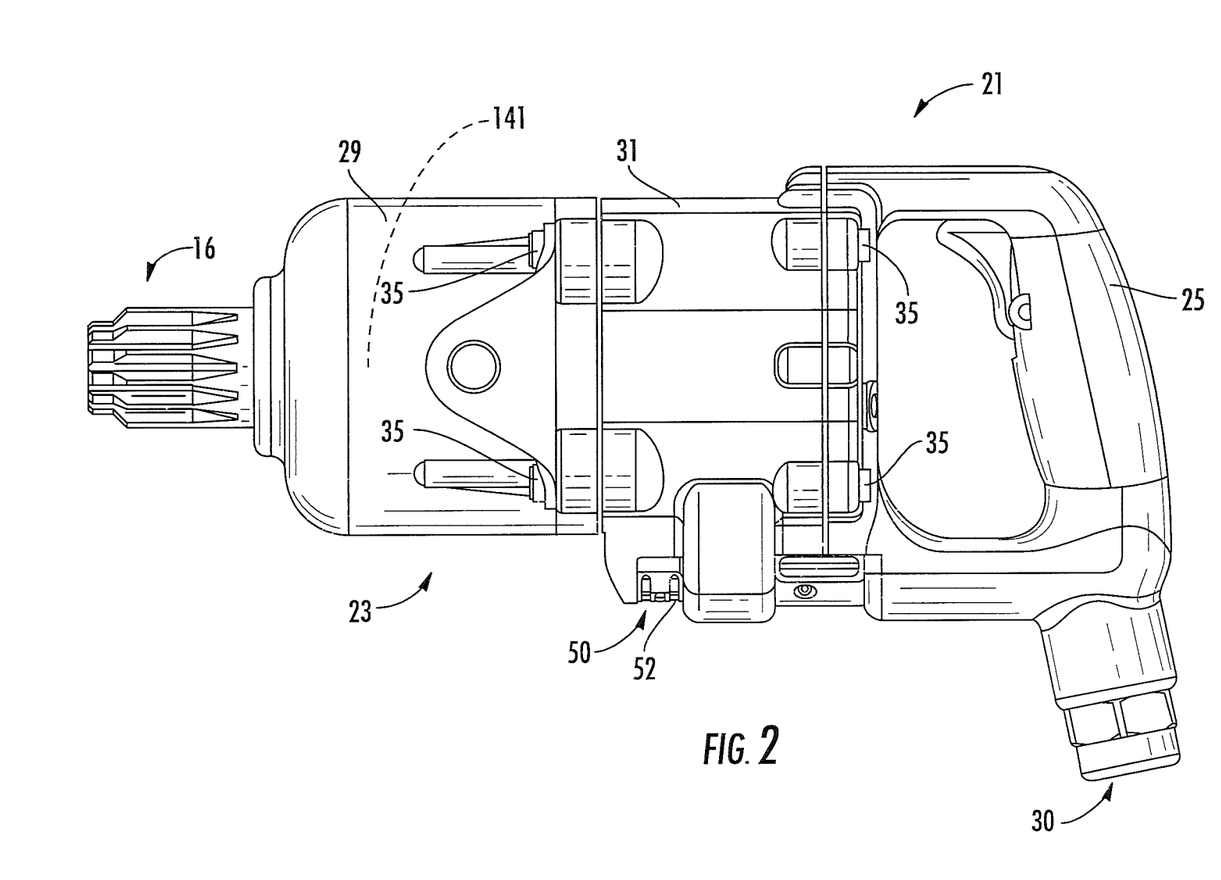
FIG. 2 is a side view of another example of a power tool according to embodiments of the present invention.
Figure 3:
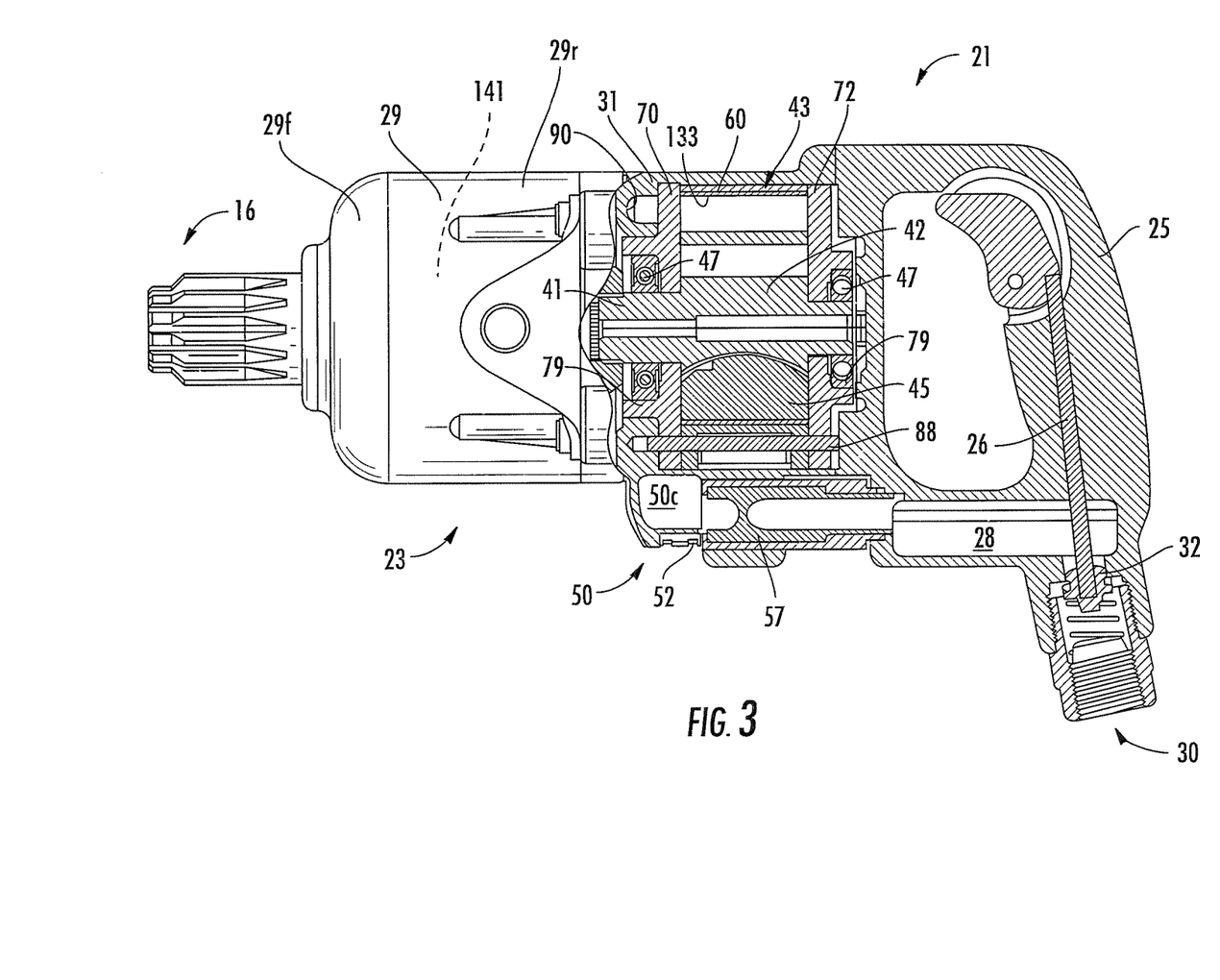
FIG. 3 is a partial cutaway side view of the power tool shown in FIG. 2 according to embodiments of the present invention.

Referring now to the drawings, shown in FIGS. 1-3 is a pneumatic power tool as indicated generally by the reference numeral 21. The pneumatic tool 21 comprises a body, indicated generally at 23, having a hammer case 29 defining a front end of the tool 21, a motor housing 31 adjacent the hammer case, and a trigger 50. The tool shown in FIG. 1 is a "pistol" type tool with a downwardly extending hand grip or handle 33. The tool shown in FIGS. 2 and 3 configure a handle 25 at a rear end of the tool.

The tool body 23 can include three primary components with the handle 33 or 25 and hammer case 29 being secured to a motor housing 31 in a suitable manner by internal and/or external fasteners, for example, fasteners 35, shown in FIG. 2. The motor housing 31 and handle 25 are typically constructed of aluminum and the hammer case 29 can be constructed of a titanium alloy. It is understood, however, that the tool body can include any number of housing components and may be constructed of other materials and may comprise any number of pieces, including one integrally formed piece, without departing from the scope of this invention.

With reference to FIG. 3, as is well known, the tool 21 includes various operating components within the body 23. For example, for pneumatic tools, disposed within the motor housing 31 is a pneumatic motor, generally indicated at 43. The pneumatic motor 43 is typically a vane motor having a rotor 42 capable of rotation about its rotational axis in a forward (clockwise) direction and a reverse (counter-clockwise) direction. The rotor 42 is rotatably mounted on an eccentric longitudinal axis within a motor chamber 33 defined within a motor cylinder 60 of the motor. The rotor 42 has a plurality of vanes 45 slidably carried within corresponding plurality of radial slots that project radially outward from the rotor and rotationally move between a fluid inlet and an exhaust aperture during rotation of the rotor.

A drive shaft 41 extends outward from opposing ends of the rotor 42 and defines the rotation axis of the motor. The drive shaft 41 is rotatably mounted in the body 23 by suitable bearings 47 disposed in bearing wells 79 of end plates 70, 72 disposed on opposite ends of motor cylinder 60 so that the rotor is supported by the drive shaft 41 and bearings 47. Drive shaft 41 is connected to and rotates a hammer mechanism 141 that is disposed in hammer case 29 and drives an output shaft 16. Hammer mechanisms useful in the pneumatic tool shown are known in the art and include, but are not limited to, those disclosed in U.S. Pat. No. 3,661,217 issued to Spencer Maurer, which patent is incorporated herein by reference.

An end of output shaft 16 projects outward from the front end of hammer case 29f and is configured for receiving a wrench socket (not shown) or other suitable fitting (not shown) adapted for engaging an object to be tightened or loosened.

More specifically, pneumatic motor 43 comprises a motor chamber 133 having an inner surface with an eccentric longitudinal axis. A fluid inlet connects the motor chamber 133 and is shown in the form of manifolds that, through inlet ports, provide pressurized motive gas to the motor chamber. Supply air is provided in the forward direction by a forward air manifold having a manifold inlet that is in fluid communication with inlet ports to the motor chamber 133. In similar fashion, a reverse air manifold (not shown) is provided that connects a manifold inlet that is in fluid communication with inlet ports to the motor chamber 133. Manifold inlets are located in motor cylinder 60 such that they are in fluid communication with a forward supply port and a reverse supply port, respectively, when the motor cylinder is inserted into motor housing 31. Generally stated, upon moving a reversing mechanism, a rotary spool element 57 is moved to selectively direct air from an inlet passageway 28 to forward supply port and reverse supply port thereby driving the air motor in a forward or reverse direction, respectively, to effect operation of the tool.

The motor chamber 133 can be provided with at least one end wall located transversely to the longitudinal axis with an exhaust aperture located therethrough. End plate 70 is disposed at the front end of the motor cylinder 60 and end plate 72 is disposed at the rear end of the motor cylinder 60. The end plates 70 and 72 may be formed from a brass alloy. Both end plates 70 and 72 are similar in that both of the presenting faces that face the motor chamber 133 can include air inlet bleed ports that are in fluid communication with kidney-shaped ports via internal bleed paths. Air inlet bleed ports register and communicate with inlet ports located in motor cylinder 60 and provide pressurized supply air to the kidney-shaped ports during operation, which pressurizes the vane slots to push vanes 45 radially outward during startup of the motor. Alignment apertures can be provided in end plates 70, 72 to properly align them with the motor cylinder 60 by registering apertures with apertures provided in motor cylinder 60 and inserting an alignment pin 88 therethrough as shown in FIG. 3. Shaft receiving bores can be provided for conducting ends of drive shaft 41 which can be journalled in bearings 47 disposed in bearing wells 79 located concentrically with the shaft receiving bores on the end plates. At least one exhaust aperture can be provided through the end plate 70. A hammer case 29 bleed path may also be included that communicates with the exhaust aperture and permits air pressure that may be created in the hammer case 29 to vent to exhaust.

The tool 21 includes a pneumatic fluid or air inlet 30 for providing motive fluid to pneumatic motor 43 via an inlet passageway 28. A valve 32 is operated by means of a trigger 50 and actuating rod 26 to admit pressure fluid to inlet passageway 28. The inlet 30 that connects the pressure fluid supply hose to the tool can be at an acute angle relative to the axis of the air path into inlet passageway 28. An exhaust channel 90 can be formed within an interior surface of the motor housing 31 as shown. Exhaust channel 90 can extend generally upward along the inner surface of the motor housing 31 and may be provided as a groove therein, against which an end plate of the motor is placed. The exhaust channel 90 is in communication with the interior of the air motor housing 31 to direct exhaust air from the exhaust ports of an end plate of the air motor as is known to those of skill in the art. At its lower end, exhaust channel 90 can be aligned and in fluid communication with an exhaust chamber 50*c* through which expanded air exhausts through exhaust vents 52 of a vent cover to atmosphere. Exhaust chamber 50*c* may be provided with an acoustical dampener or muffler (not shown. By aligning the exhaust channel 90 with the exit path of exhaust air out of the tool, directional changes of the exhaust air exiting the tool may be minimized to reduce back pressure and improve tool performance.

The power tools and air paths, valves and configurations shown in FIGS. 1-3 and described above are by way of example only and not limiting to the claimed invention.

Turning now to FIGS. 4-12, examples of subassemblies 10*s* of hammer cases 29 and interface flanges 129 are shown. Generally stated, the interface flange 129 is attached to an inner surface/inner wall of a rear portion 29*r* of the hammer case 29. The interface 129 and hammer case 29 can be attached (as a subassembly) to the motor housing 31 (FIGS. 1, 2).

The hammer case 29 can be drawn titanium material having suitable toughness to contain an impact mechanism 141 that may be hurled at high speed and with considerable energy in the event of a mechanical failure. Thus, the hammer case 29 can act as a containment structure. Such materials include titanium-based materials having a yield strength of from about 70 Ksi to about 120 Ksi (or greater) and an ultimate tensile strength of from about 90 Ksi to about 130 Ksi (or greater). The titanium-based material can be lightweight with a density of 0.16 lbs/in$^3$ or less. Exemplary materials include, but are not limited to titanium based alloys of Ti-6Al-4V, Ti-3Al-2.5V and Ti-4Al-2V in which the addition amounts of aluminum and vanadium are percentages by weight.

The hammer case 29 may be manufactured using drawn titanium methods that facilitate the formation of various wall configurations having combinations of wall thicknesses, t, and shape contour radii, r, to provide exterior and interior shapes having any desired degree of intricacy. Currently, hammer cases that are made of titanium are produced using the investment casting manufacturing method. The investment casting method can be relatively wasteful with material and is also time and labor intensive.

Embodiments of the invention employ deep drawn stamping techniques to reduce the amount of titanium used per hammer case which can be more fiscally economic over investment casting methods. The deep drawn stamping methods can also be carried out as a much faster process and can be highly automated, eliminating labor costs.

Embodiments of the hammer case 29 can include a monolithic, single piece titanium thin-walled titanium shell body. The shell body 29*b* can be formed with a substantially constant thin wall thickness over at least a major portion thereof to eliminate titanium material in unnecessary areas, making for a very efficient design.

Figure 4:
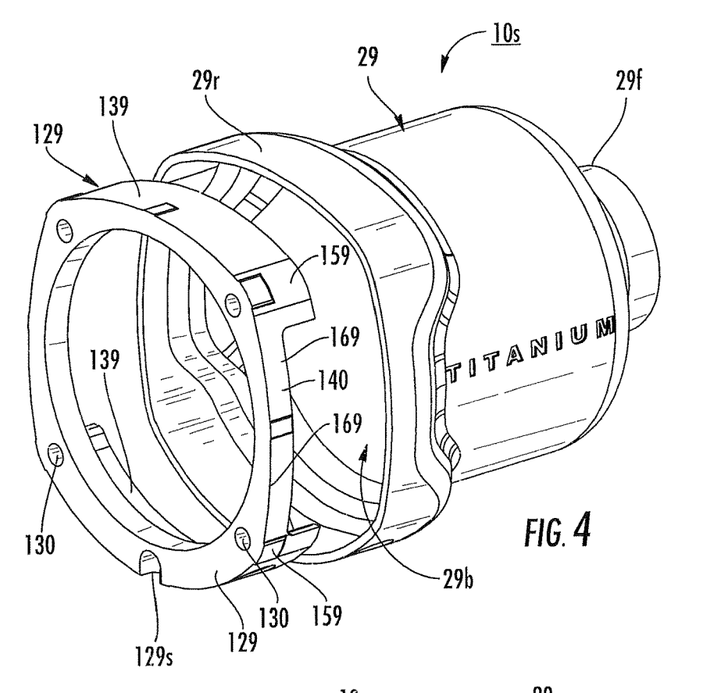
FIG. 4 is an exploded side perspective view of a hammer case and flange subassembly according to embodiments of the present invention.

The hammer case 20 can have a deep drawn thin wall titanium housing body with the forward portion 29*f* having a cylindrical shape and with the rearward portion 29*r* having a curvilinear shape (FIG. 4).

As shown in FIGS. 4-14, for example, to attach the hammer case 29 to the tool 21 and/or motor housing 31 or other tool body component, an interface flange 129 is inserted into the hammer case shell body 29*b*. The flange 129 can be made from any material, typically not titanium due to cost, using for example, a more cost effective material such as steel, aluminum, magnesium, fiber reinforced carbon and the like. The flange 129 can be made of one or a combination of materials, and in some embodiments comprises powdered metal steel.

The flange 129 can be permanently attached to the shell body 29*b*. The term "permanently" means that the flange cannot be removed from the shell body without causing damage to the titanium shell or the flange. The interface flange 129 can be configured to be attached to the hammer case 29 to withstand a pull-out force of at least 1000 lbs, such as between 5,000-8,000 lbs, applied for at least two seconds. For example, the interface flange can be attached to the hammer case to withstand a pull-out force of about 1000 lbs, about 2000 lbs, about 3000 lbs, about 4000 lbs, about 5000 lbs, about 6000 lbs, about 7000 lbs or about 8000 lbs., applied for two seconds.

The flange 129 can be mechanically joined and/or welded, bonded, brazed and/or crimped into place to secure the shell body 29*b* to the interface flange 129. The term "bonded" refers to chemical, epoxy and/or adhesive attachments. Welding, if used, can include inertia welding and laser welding (the latter where a titanium shell is used) or other welding methods.

In some embodiments, the flange 129 can be inserted into the rear of the hammer case 29*r* and held via an interference fit with a plurality of detents 159 on an outer perimeter of the flange 129. The flange 129 can then be secured in position. In some embodiments, the flange 129 is bonded in position with structural epoxy adhesive such as 920 structural epoxy adhesive from 3M Company. The interfacing surfaces (inner surface of hammer case and outer surface of flange) can be roughened prior to pressing the flange into the rear part of the cavity of the hammer case 29.

Figure 9A:
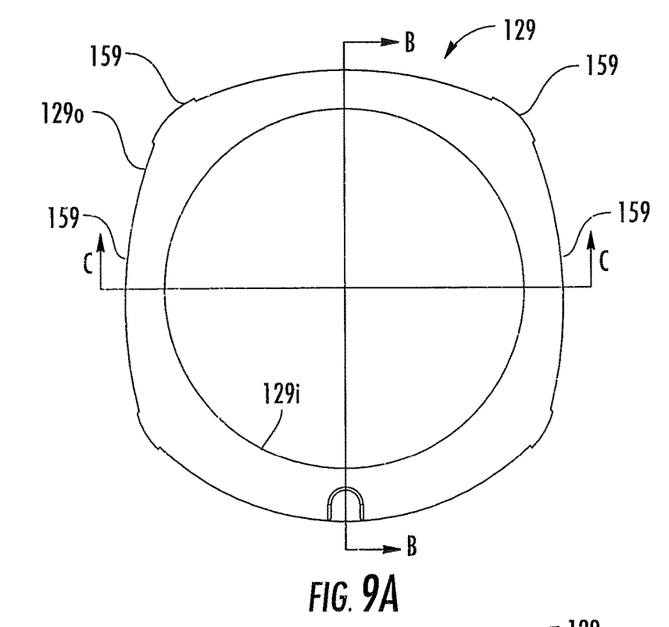
FIG. 9A is an end view of an exemplary flange according to embodiments of the present invention.

The detents 159 can be at least two detents. The detents 159 can be configured with the same or different configurations about the perimeter of the flange 129. As shown in FIG. 9A, the detents 159 include four rounded corner detents (FIG. 9A) that can increase surfaced area to increase area for adhesion. However, the detents 159 can have other configurations and be provided in different numbers and placed in different locations about the perimeter of the flange 129.

Figure 9B:
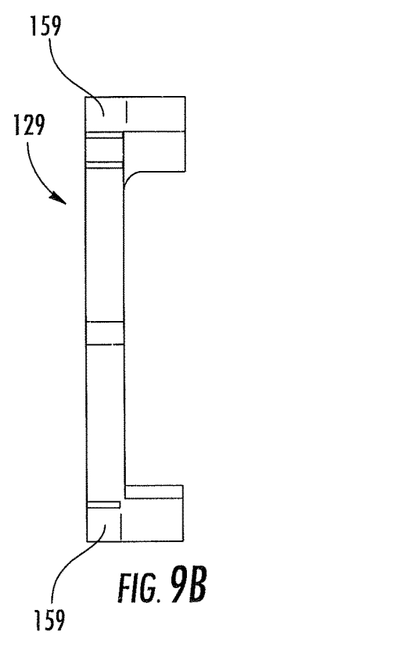
FIG. 9B is a side view of the flange shown in FIG. 9A.
Figure 9C:
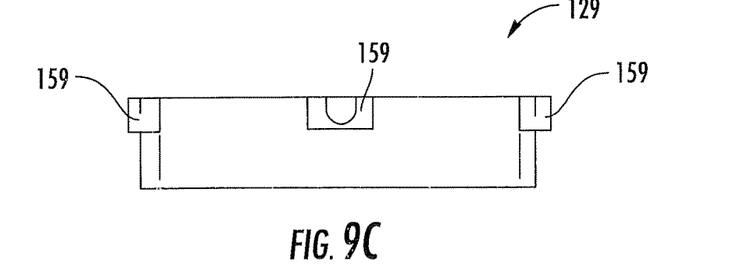
FIG. 9C is another side view of the flange shown in FIG. 9A (the bottom side of the orientation shown in FIG. 9A).

As shown in FIGS. 9A-9C the flange includes four corner detents. As shown in FIGS. 9A-9C, the flange 129 can also include four additional detents 159, one of each which resides between adjacent corner detents. The six detents can be spaced apart about every 45 degrees of the flange. Two or more of these interior detents 159 may be slightly off center (as shown the two side detents are above the center line by about 0.084 inches). The detents 159 may be particularly suitable for the adhesive/epoxy embodiments and are not required for other attachment configurations.

As shown in FIG. 9A, the wall of the flange 129 can be such that the inner perimeter profile 129*i* has a circular shape while the outer perimeter profile 129*o* of the flange 129 is curvilinear to provide sections with different radii and different thicknesses. There can be small lead-in (gradual ramp) on each side of respective detents 159 to help align the flange 129 with the shell body and facilitate assembly.

Figure 5:
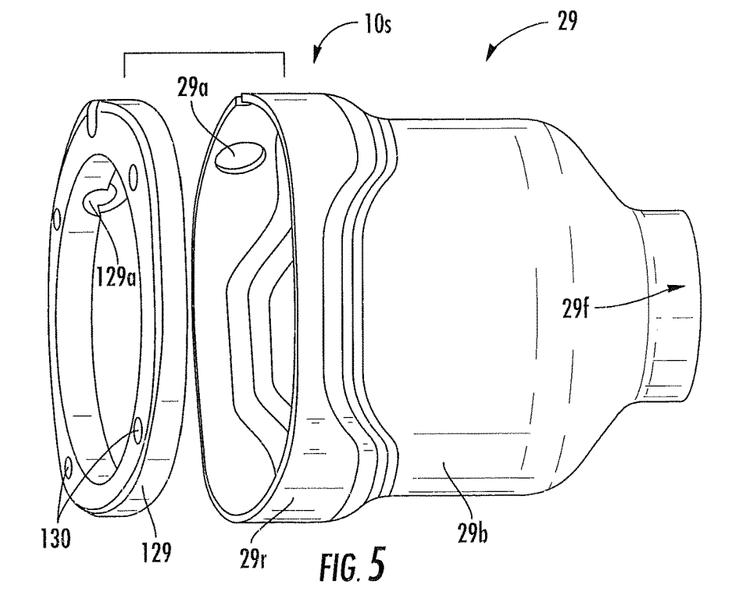
FIG. 5 is an exploded side perspective view of a hammer case and modified flange subassembly according to embodiments of the present invention.
Figure 6:
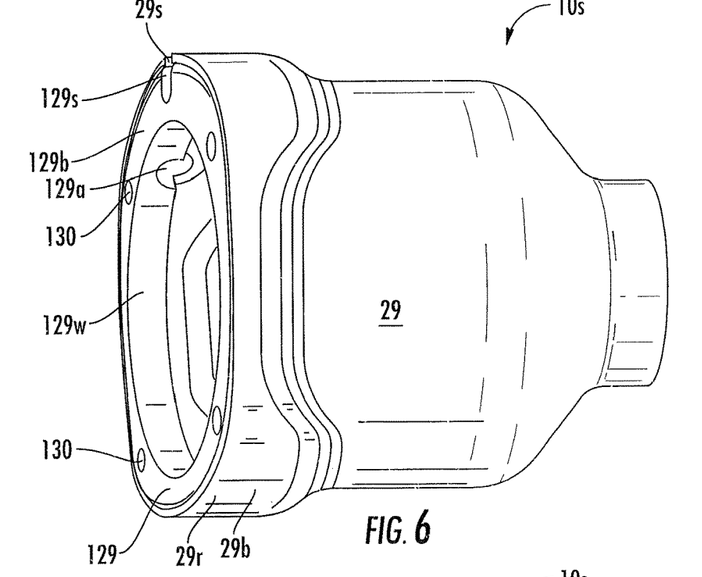
FIG. 6 is a side perspective assembled view of the hammer case and flange subassembly shown in FIG. 5 according to embodiments of the present invention.

Referring to FIGS. 4-6, the flange 129 can include an aperture 129*a* extending outward through an axially extending wall 129*w* and a slot 129*s* extending across a rear planar surface 129*p* (that faces the motor) toward the wall of the hammer case 29. The flange 129 can also include a plurality of spaced apart apertures 130 that attach to fixation members of the tool body 23. As shown in FIG. 4, the flange 129 can include upper and lower axially extending walls 139 that extend a further distance toward the front of the hammer case 29*f* relative to adjacent (shorter in an axial direction) sidewalls 140.

As shown in FIG. 6, when assembled, the flange 129 is substantially flush with the rear end of the shell body of the hammer case 29. The through apertures 29*a*, 129*a* can provide a grease fitting for future maintenance/use to access the interior of the tool.

Figure 7:
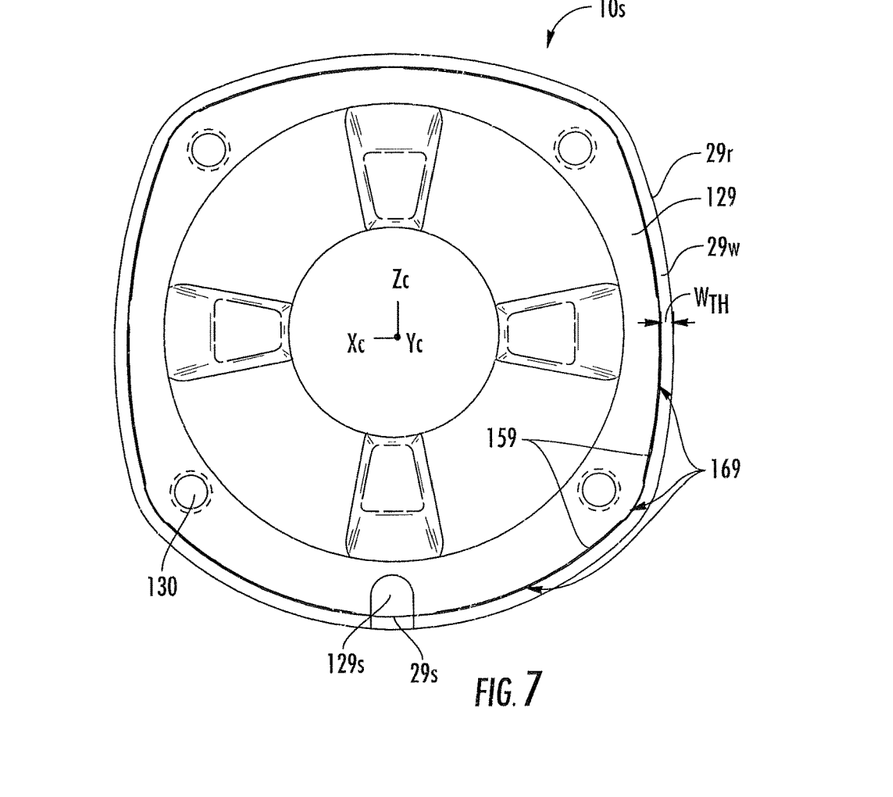
FIG. 7 is a greatly enlarged end view of a hammer case and flange subassembly according to embodiments of the present invention.
Figure 8:
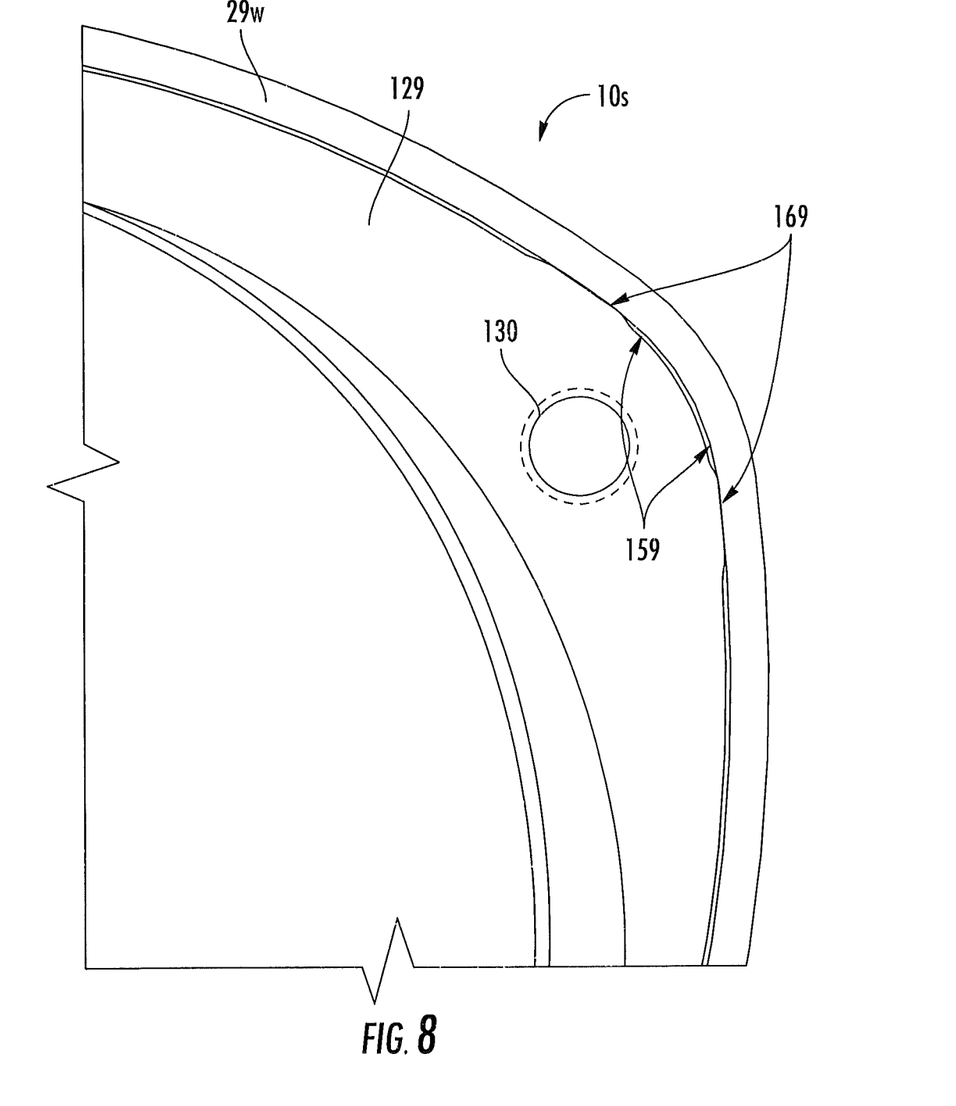
FIG. 8 is a greatly enlarged portion of one corner of the hammer case and flange subassembly shown in FIG. 7.

FIGS. 7 and 8 illustrate the flange 129 in position inside the hammer case 29 with interference fit segments 159*s* provided by the detents 159 and small air gaps 169. The air gaps can have a width that is less than 0.01 inches, typically about 0.005 inches. The interference fit can be between about 0.001 to about 0.003 inches, typically about 0.002 inches.

Figure 14A:
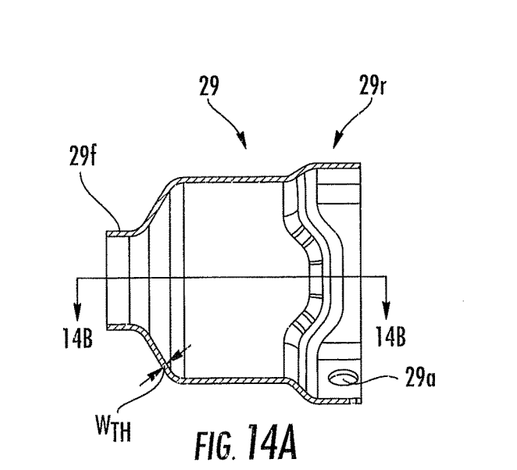
FIG. 14A is a section view taken along lines 14A-14A in FIG. 13 according to embodiments of the present invention.
Figure 14B:
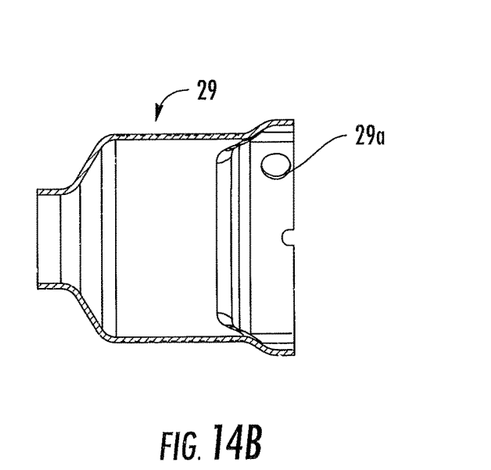
FIG. 14B is a section view taken along lines 14B-14B in FIG. 14A according to embodiments of the present invention.

In some embodiments, the hammer case 29 has at least a major portion including the rear 29*r* can have a substantially constant thin wall thickness $W_{th}$ (FIGS. 7, 13, 14A, 14B). The term "thin" refers to a wall thickness that is under 0.08 inches. In some embodiments, the wall thickness is between about 0.0700 to about 0.0600 inches, typically about 0.0625 inches. In some embodiments, the entire hammer case 29 has a substantially constant thin wall thickness as shown in FIG. 14A. Substantially the entire shell body can have the same thin wall thickness (on average). In some embodiments, the shell body can have a thin wall thickness that is between about 0.0700 to about 0.0600 inches, and more typically about 0.0625 inches (on average).

The hammer case 29 can have a cylindrical neck at a forward end 29*f* thereof and can have a curvilinear outer profile at the rear end thereof 29*r*.

Figure 10:
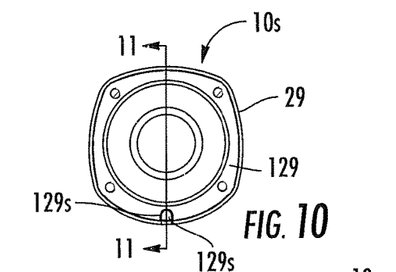
FIG. 10 is an end view of an assembled hammer case and flange according to embodiments of the present invention.
Figure 11:
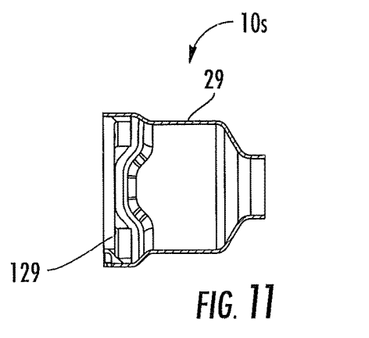
FIG. 11 is a section view taken along lines 11-11 of FIG. 10 according to embodiments of the present invention.
Figure 12:
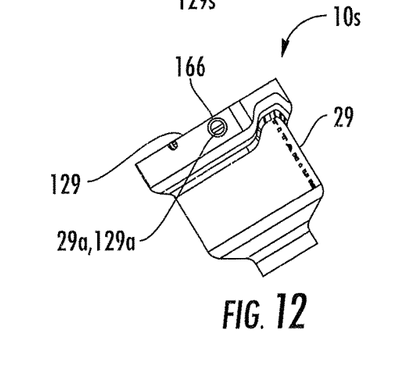
FIG. 12 is a side assembled view of the hammer case and flange subassembly shown in FIG. 10 according to some embodiments of the present invention.
Figure 13:
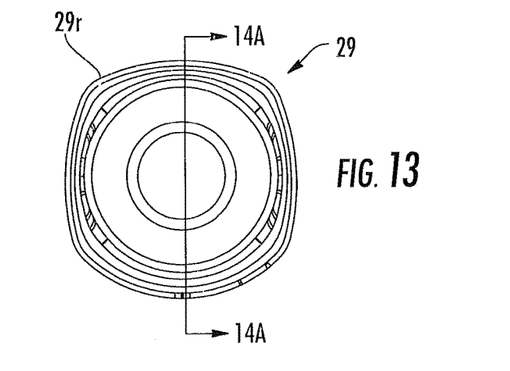
FIG. 13 is an end view of a hammer case according to embodiments of the present invention.

FIGS. 10 and 11 show the flange 129 and hammer case 29 after the epoxy is inserted (either manually and/or via a vacuum or pressure source).

FIGS. 15A-15C, 16A and 16B illustrate another exemplary embodiment of a flange/shell subassembly 10*s* with a mechanical joint 200 attachment configuration of the flange 129 to the shell 29. As shown, the interface flange 129 can have at least one attachment feature 229 (shown as a shallow recess 229*r*) at a location intermediate the forward and rearward ends of the flange 129 and proximate a rear end of the shell 29*r* that mates with a corresponding at least one attachment feature 329 in the shell body 29. Typically, the attachment features 229, 329 reside inward from the rear edge of both of the flange and shell bodies a distance of about 0.1 to about 0.5 inches, such as about 0.1 inches, about 0.15 inches, about 0.2 inches, about 0.25 inches, about 0.3 inches, about 0.35 inches, about 0.4 inches, about 0.45 inches and about 0.5 inches.

In the embodiment shown, frictional engagement of the shell 29 to the flange 129 using the matable engagement features 229, 329 can cause titanium material 29*m* of the shell 29 to be pushed into the flange 129 creating a mechanical joint 200. Structural epoxy/adhesive can be used with the matable features 229, 329 for the mechanical joint 200.

The mechanical joint 200 is shown as comprising two transversely extending continuous groove segments 229*r* on opposing sides of the flange 129 with corresponding shaped spaced apart projections 329 on the shell body 29. It is noted that the groove segment 229*r* can be discontinuous and/or the upper and lower groove segments 229$_1$, 229$_2$, can have different shapes, depths and/or lengths. The corresponding projections 329$_1$, 329$_2$ can be configured as one projection of sets of side-by-side transversely extending projections. Also, the joint 200 can have other configurations such as, but not limited to, (round) dimples or other impression configuration or embossed patterns or designs that can provide a suitable interlocking function in support of the mechanical joint 200.

Figure 15A:
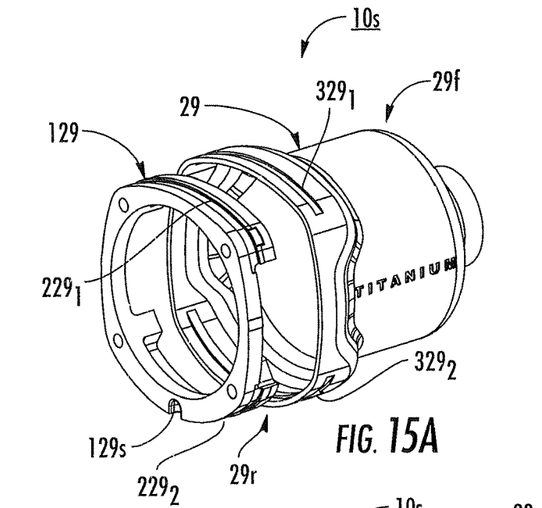
FIG. 15A is an exploded view of a flange/hammer case subassembly according to some embodiments of the present invention.
Figure 15B:
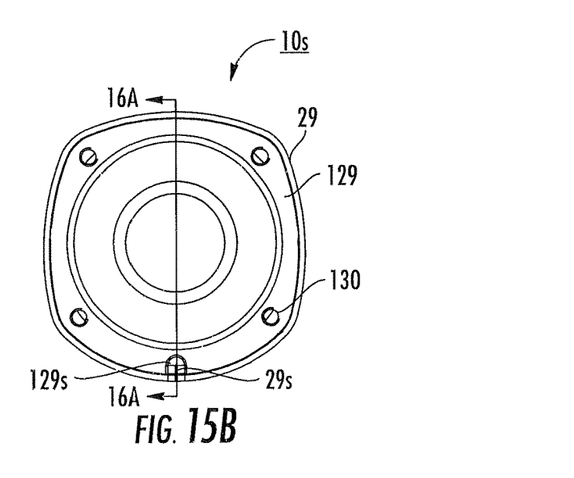
FIG. 15B is an assembled end view of the subassembly shown in FIG. 15A.
Figure 15C:
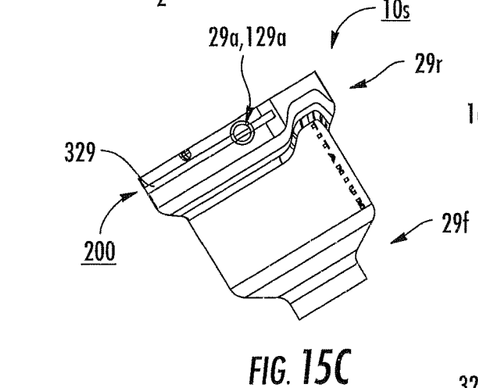
FIG. 15C is a side view of the subassembly shown in FIG. 15A.
Figure 16A:
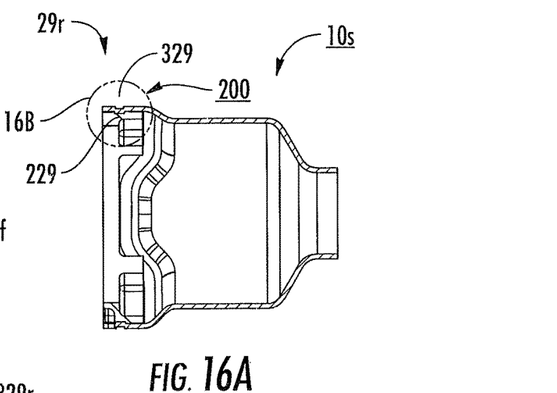
FIG. 16A is a side section view taken along lines 16A-16A in FIG. 15B.
Figure 16B:
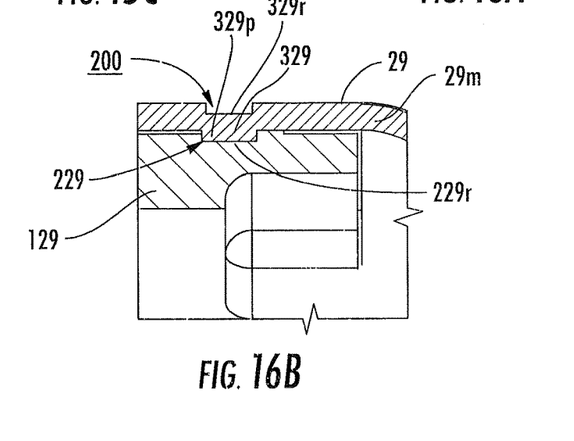
FIG. 16B is an enlarged view of detail 16B shown in FIG. 16A.
Figure 17A:
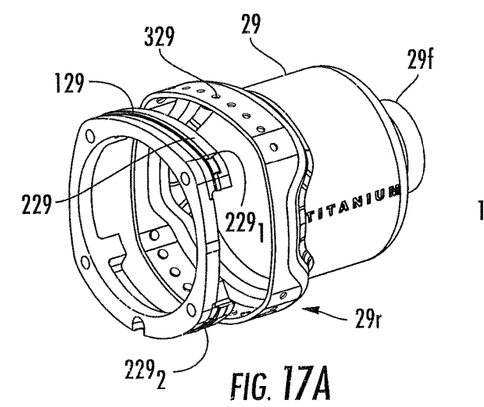
FIG. 17A is an exploded side view of another flange/hammer case subassembly according to some embodiments of the present invention.
Figure 17B:
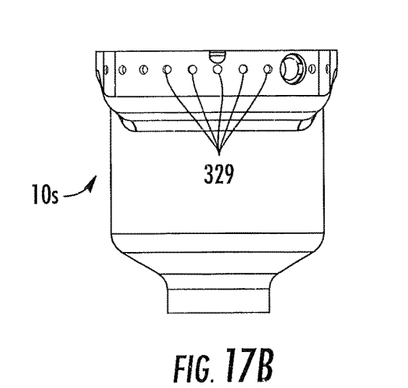
FIG. 17B is a side assembled view of the subassembly shown in FIG. 17A.
Figure 17C:
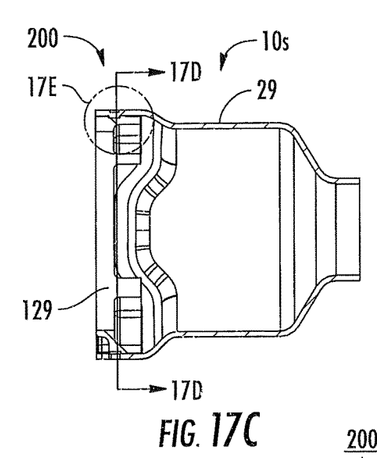
FIG. 17C is a section view (taken along the same section lines as 16A-16A in FIG. 15A but for the different interface) of FIG. 17A.
Figure 17D:
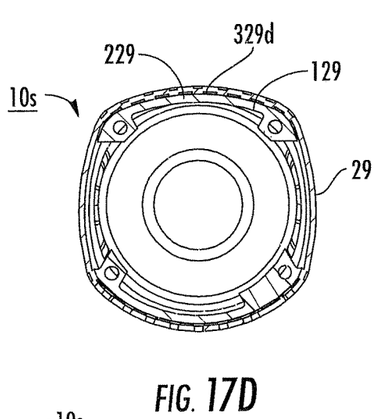
FIG. 17D is a section view taken along lines 17D-17D of FIG. 17C according to embodiments of the present invention.
Figure 17E:
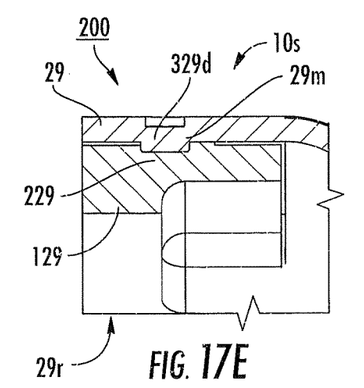
FIG. 17E is an enlarged cutaway view of the subassembly of FIG. 17A corresponding to detail E in FIG. 17C).

In the embodiment shown, the flange 29 has a shallow transversely extending recess with a channel depth of between about 0.01 inches to about 0.05 inches, typically about 0.25 inches. The recess 229*r* can hold structural epoxy during assembly. The recess 229*r* can have a relatively narrow width that is about 3×, about 4×, about 5×, about 6×, about 7× or about 8× the depth dimension, typically between 0.1 to about 0.2 inches, such as about 0.125 inches.

The shell 29 can include a recess 329*r* on an external surface thereof that corresponds to the shape and size of the projection 329*p* on the inner surface thereof In the embodiment shown, the flange 129 has a (rounded) recess or groove detent 229*r* on the outside that engages a mating shell protrusion 329*p* that projects inwardly from the shell 29.

FIGS. 17A-17E illustrate a flange/hammer case subassembly 10*s* with a different attachment feature 329 for the mechanical joint 200. In this exemplary embodiment, the attachment feature 329 comprises a plurality of transversely spaced apart projecting members 329*d* (e.g., rounded dimples) that can matably engage the flange interface feature 229 as shown. The members or dimples 329 can be symmetrically spaced apart about the perimeter, typically between about 10-20 (shown as about 19 dimples) with a suitable max diameter of between about 0.1 to about 0.25 inches, for example. The interface flange attachment feature 229 can include one or more transverse slots or a series of shallow valleys facing the dimples 329, for example. The projecting members 329*d* can have different diameters or cross-sectional sizes and may have different inwardly projecting dimensions and/or widths. Combinations of the transverse projections 329p and dimples 329d may also be used.

The mechanical joint 200 can be used alone or with the interference fit associated with the corner or outward detents 159 on the flange 129 to create the gap for the epoxy or adhesive.

The mechanical joint 200, alone, or with the interference fit of the corners or other surfaces of the flange to the shell, can provide a structural attachment that can withstand a pullout force of at least 1000 pounds for at least two seconds, typically between 5000-10,000 lbs, applied for at least two seconds without allowing pull out or separation of the flange 129 from the shell 29 and/or without failure of the joint 200. The shell/flange subassembly can withstand a pull-out force of about 5000 lbs, about 6000 lbs, about 7000 lbs or about 8000 lbs., applied for two seconds without failure of the joint 200 and/or pull out of the flange 129 from the shell 29.

Figure 18:
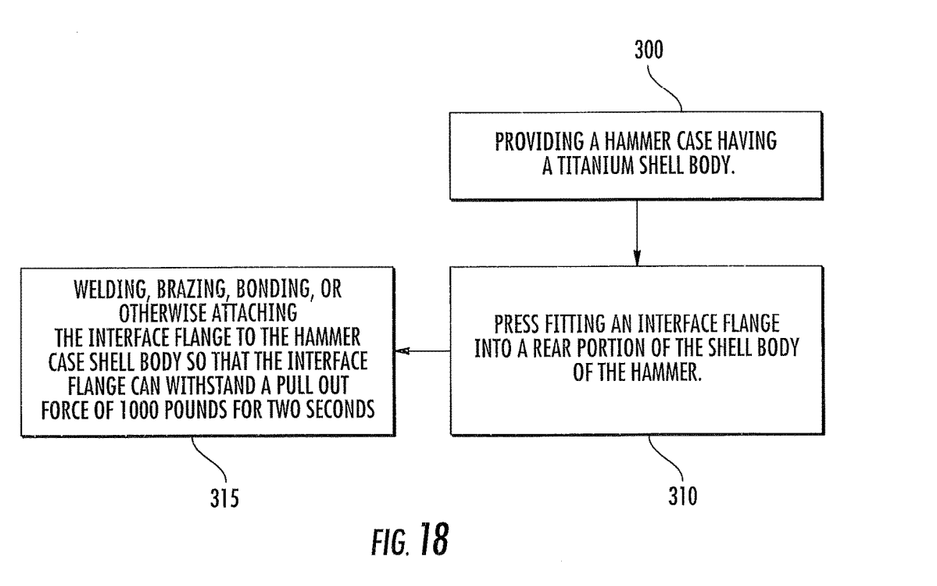
FIG. 18 is a flow chart of exemplary assembly steps that can be used to assemble a power tool according to embodiments of the present invention.

FIG. 18 is a flow chart of exemplary operations that can be used to assemble a (portion of a) power tool. A hammer case having a titanium shell body can be provided (block 300). The shell body can be cold drawn titanium and some portions may be machined. An interface flange can be press-fitted into a rear portion of the shell body of the hammer case (block 310). After the press-fitting, the interface flange can be mechanically joined and/or, welded, brazed, bonded, attached via structural epoxy or otherwise (permanently) attached to the hammer case shell body so that the interface flange can withstand a suitable pull-out force (e.g., about 1000, about 2000, about 3000, about 4000, about 5000, about 6000, about 70000, or about 8000 pounds or more) for at least two seconds.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A power tool, comprising:
an external titanium housing having a forward portion and an opposing rearward portion and a cavity extending therebetween, wherein the titanium housing has a body of titanium with at least a major portion thereof, including a rear section thereof, having a thin wall with a substantially constant thickness;
an interface flange residing in the titanium housing cavity; and an external motor housing extending rearward of the external titanium housing and attached to the interface flange, wherein the interface flange is internal with respect to the external titanium housing and external motor housing,
wherein the interface flange has a plurality of corner detents extending outwardly thereby defining at least a portion of an outermost curvilinear perimeter thereof, the corner detents provide an interference fit with corners of an inner surface of the titanium housing; and
wherein the interface flange comprises at least one transversely extending recess, and wherein the titanium housing comprises at least one inwardly extending projection that cooperates with the at least one transversely extending recess.

2. A power tool, comprising:
an external titanium housing having a forward portion and an opposing rearward portion and a cavity extending therebetween, wherein the titanium housing has a body of titanium with at least a major portion thereof, including a rear section thereof, having a thin wall with a substantially constant thickness;
an interface flange residing in the titanium housing cavity; and an external motor housing extending rearward of the external titanium housing and attached to the interface flange, wherein the interface flange is internal with respect to the external titanium housing and external motor housing,
wherein the interface flange has a plurality of corner detents extending outwardly thereby defining at least a portion of an outermost curvilinear perimeter thereof, the corner detents provide an interference fit with corners of an inner surface of the titanium housing; and
wherein the interface flange has opposing front and rear ends and an outerwall extending therebetween with at least one attachment feature on the outerwall residing between the front and rear ends, wherein the titanium housing body has at least one cooperating attachment feature residing on an internal surface thereof residing proximate a rear end portion of the titanium housing body, and wherein the interface flange and titanium housing body attachment features tightly abut to define a mechanical joint and wherein the interface flange attachment feature comprises at least one recess, and wherein the titanium housing body attachment feature comprises at least one inwardly extending projection.

3. A power tool, comprising:
an external titanium housing having a forward portion and an opposing rearward portion and a cavity extending therebetween, wherein the titanium housing has a body of titanium with at least a major portion thereof, including a rear section thereof, having a thin wall with a substantially constant thickness;
an interface flange residing in the titanium housing cavity; and an external motor housing extending rearward of the external titanium housing and attached to the interface flange, wherein the interface flange is internal with respect to the external titanium housing and external motor housing,
wherein the interface flange has a plurality of corner detents extending outwardly thereby defining at least a portion of an outermost curvilinear perimeter thereof, the corner detents provide an interference fit with corners of an inner surface of the titanium housing;
wherein the interface flange has opposing front and rear ends and an outerwall extending therebetween with at least one attachment feature on the outerwall residing between the front and rear ends, wherein the titanium housing body has at least one cooperating attachment feature residing on an internal surface thereof residing proximate a rear end portion of the titanium housing body, and wherein the interface flange and titanium housing body attachment features tightly abut to define a mechanical joint; and wherein the interface flange attachment feature comprises at least one transversely extending recess, and wherein the titanium housing body attachment feature comprises at least one inwardly extending projection.

4. The power tool of claim 3, wherein the power tool is an impact wrench and the titanium housing is a hammer case.

5. The power tool of claim 3, wherein the titanium housing body is a deep drawn titanium body, wherein the forward portion has a cylindrical shape, and wherein the rearward portion has a curvilinear shape.

6. The power tool of claim 3, wherein the interface flange can withstand a pull out force of 1000 lbs. for two seconds.

7. The power tool of claim 3, wherein the titanium housing body is a monolithic unitary body of deep drawn titanium that has a thin wall of substantially constant thickness.

8. A hammer case for a power tool impact wrench, comprising:
a thin wall titanium shell tapering from a smaller cylindrical forward section to a larger curvilinear rearward section, with at least the curvilinear rearward section having a wall with a substantially constant wall thickness; and
an interface flange residing in a cavity of the shell, wherein the interface flange comprises an outermost perimeter profile that is curvilinear and defines a plurality of outwardly extending detents that provide an interference fit with the shell wall of the hammer case, so that when the interface flange is press fit with the shell small air gap spaces reside on opposing sides of each detent prior to permanent fixation with epoxy or adhesive, and wherein, in use, the small gap spaces are closed with adhesive or epoxy; and
wherein the interface flange comprises at least one transversely extending recess and the titanium shell comprises at least one inwardly extending projection that cooperates with the at least one transversely extending recess.

9. A hammer case for a power tool impact wrench, comprising:
a thin wall titanium shell tapering from a smaller cylindrical forward section to a larger curvilinear rearward section, with at least the curvilinear rearward section having a wall with a substantially constant wall thickness;
an interface flange residing in a cavity of the shell, wherein the interface flange comprises an outermost perimeter profile that is curvilinear and defines a plurality of outwardly extending detents that provide an interference fit with the shell wall of the hammer case, so that when the interface flange is press fit with the shell small air gap spaces reside on opposing sides of each detent prior to permanent fixation with epoxy or adhesive, and wherein, in use, the small gap spaces are closed with adhesive or epoxy;

wherein the interface flange has opposing front and rear ends and an outerwall extending therebetween with at least one attachment feature on the outerwall residing between the front and rear ends, wherein the titanium shell has at least one cooperating attachment feature residing on an internal surface thereof residing proximate an end of the rearward section, and wherein the interface flange and shell attachment features tightly abut to define a mechanical joint, and wherein the interface flange attachment feature comprises at least one recess, and wherein the titanium shell attachment feature comprises at least one inwardly extending projection.

10. A hammer case for a power tool impact wrench, comprising:
a thin wall titanium shell tapering from a smaller cylindrical forward section to a larger curvilinear rearward section, with at least the curvilinear rearward section having a wall with a substantially constant wall thickness;
an interface flange residing in a cavity of the shell, wherein the interface flange comprises an outermost perimeter profile that is curvilinear and defines a plurality of outwardly extending detents that provide an interference fit with the shell wall of the hammer case, so that when the interface flange is press fit with the shell small air gap spaces reside on opposing sides of each detent prior to permanent fixation with epoxy or adhesive, and wherein, in use, the small gap spaces are closed with adhesive or epoxy;
wherein the interface flange has opposing front and rear ends and an outerwall extending therebetween with at least one attachment feature on the outerwall residing between the front and rear ends, wherein the titanium shell has at least one cooperating attachment feature residing on an internal surface thereof residing proximate an end of the rearward section, and wherein the interface flange and shell attachment features tightly abut to define a mechanical joint; and
wherein the interface flange attachment feature comprises at least one transversely extending recess, and wherein the titanium shell attachment feature comprises at least one inwardly extending projection.

11. The hammer case of claim 10, wherein there are six substantially equally spaced apart interface flange detents providing interference fit interleaved with adjacent gap spaces.

12. The hammer case of claim 10, wherein the interface flange is bonded to the hammer case so that a rear surface of the flange is flush with a rear of the hammer case, and wherein the interface flange can withstand a pull out force of 1000 lbs. for two seconds.

13. The hammer case of claim 10, wherein the titanium housing is a monolithic unitary body that is formed from deep drawn titanium.

* * * * *